United States Patent [19]

Samuelson

[11] Patent Number: 5,353,663

[45] Date of Patent: Oct. 11, 1994

[54] COMBINATION BICYCLE LOCK/HANDLEBAR ASSEMBLY

[76] Inventor: Robert N. Samuelson, Munson Rd., Middlebury, Conn. 06762

[21] Appl. No.: 137,803

[22] Filed: Oct. 18, 1993

Related U.S. Application Data

[63] Continuation-in-part of Ser. No. 952,589, Sep. 28, 1992, abandoned.

[51] Int. Cl.⁵ .................. B62K 21/12; B62H 5/00
[52] U.S. Cl. .................. 74/551.8; 74/551.1; 70/233; 280/288.4
[58] Field of Search .................. 74/551.8–551.9; 280/288.4, 297; 248/229, 231.5; 224/30 R, 31, 41; 70/18, 233, 234, 258

[56] References Cited

U.S. PATENT DOCUMENTS

| | | | |
|---|---|---|---|
| 3,967,475 | 7/1976 | Zane | 70/18 |
| 4,355,922 | 10/1982 | Sato | 248/229 X |
| 4,408,924 | 10/1983 | Huebner | 403/23 |
| 4,674,306 | 6/1987 | Halpern | 70/233 |
| 4,724,692 | 2/1988 | Turin et al. | 70/233 X |
| 4,783,029 | 11/1988 | Geppert et al. | 248/74.1 |
| 4,873,886 | 10/1989 | Renner | 74/551.8 |
| 4,878,397 | 11/1989 | Lennon | 74/551.1 |
| 4,888,967 | 12/1989 | Kuo | 70/52 |
| 4,946,122 | 8/1990 | Ramsey et al. | 248/229 |
| 4,951,525 | 8/1990 | Borromeo | 74/551.1 |
| 5,000,469 | 3/1991 | Smith | 74/551.9 X |
| 5,033,325 | 7/1991 | Giard | 74/551.3 |
| 5,092,142 | 3/1992 | Zane et al. | 70/39 |
| 5,133,568 | 7/1992 | Balterman | 74/551.8 X |
| 5,138,901 | 8/1992 | Dabandjian et al. | 74/551.8 |
| 5,163,339 | 11/1992 | Giard, Jr. et al. | 74/551.8 X |
| 5,226,341 | 7/1993 | Shores | 74/551.8 |

FOREIGN PATENT DOCUMENTS

91/16231  10/1991  PCT Int'l Appl. .............. 280/288.4

OTHER PUBLICATIONS

Profile, Would you buy a bike that doesn't have an adjustable seat? ©1990, Whole Document.
Scott®, Strategic Gear™, ©1990, Whole Document.
T-Gear, 1991 Made in USA, 1991, Whole Document.

Primary Examiner—Vinh T. Luong
Attorney, Agent, or Firm—William C. Crutcher

[57] ABSTRACT

A pair of bracket assemblies for mounting on the handlebars of a bicycle to enable use of a bicycle lock as an auxiliary handlebar. The bicycle lock includes a U-shaped member with spaced parallel legs. Each of the legs is supported in a separate bracket assembly. The bracket assemblies incorporate arm rests and permit longitudinal adjustment of the legs. Various types of release and securing mechanisms are disclosed which enable adjustment and removal of the bicycle lock, including angular adjustments of the legs of the U-shaped member with respect to the handlebar.

12 Claims, 4 Drawing Sheets

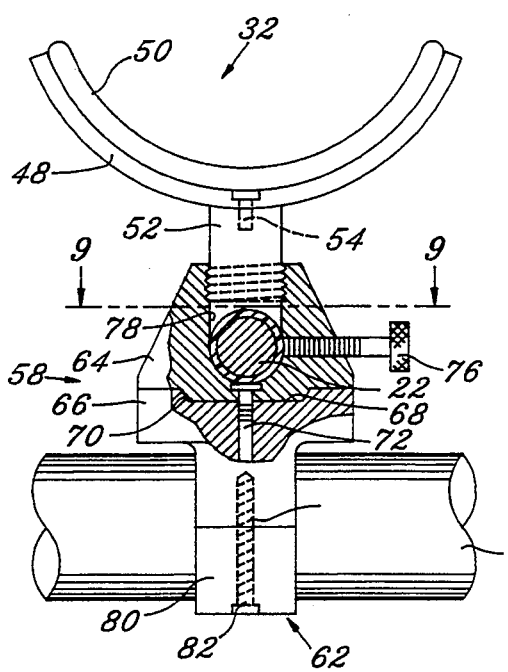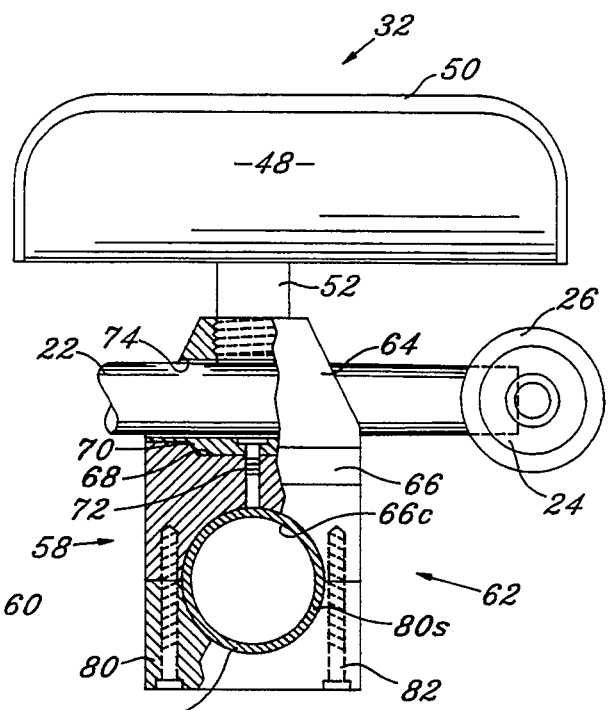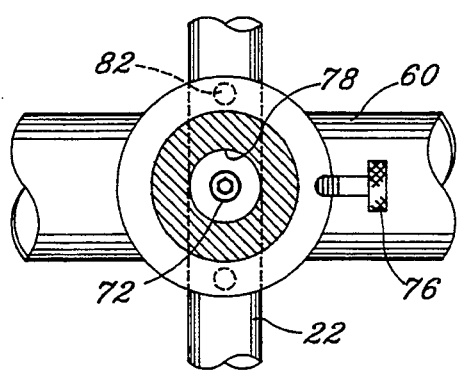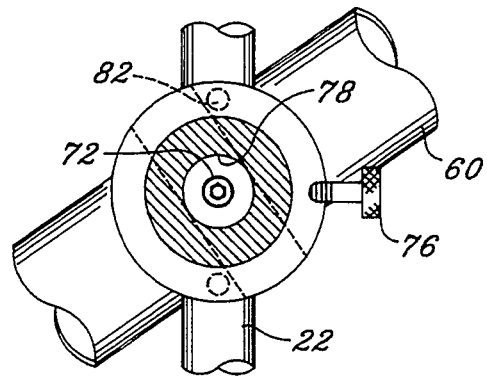

COMBINATION BICYCLE LOCK/HANDLEBAR ASSEMBLY

CROSS REFERENCE TO RELATED APPLICATION

This application is a continuation-in-part of U.S. application Ser. No. 07/952,589 filed Sep. 28, 1992, now abandoned.

BACKGROUND OF THE INVENTION

1. Field of the Invention

This invention relates to a combination bicycle lock/handlebar assembly, and more specifically to such a device in which a lock is capable of use for locking a bicycle in a standard manner, and in which the lock also is removably attachable to existing handlebars of the bicycle to provide an auxiliary handlebar-and-arm rest assembly, which enables a rider to adopt a riding position which is both comfortable and aerodynamic.

2. Description of the Prior Art

As bicycling continues to play an increasing role in personal transportation, such as for commuting, running errands, shopping and/or for other reasons, including exercise and pleasure, the ability to immobilize the bicycle against movement to prevent theft, such as by securing parts of the bicycle together and/or to a stationary object, has become more and more important. At the same time, the ability of a rider to ride in an enjoyable and efficient manner, including the ability to assume various aerodynamic positions with ease and comfort, also has become similarly important.

Bicycle locks of the type comprising a U-shaped shackle member having a bight portion and spaced parallel legs which can be releasably locked to an elongated cross-bar member, are known in the prior art. For example, such locking devices are disclosed in U.S. Pat. Nos. 4,674,306 to Offer Halpern, 4,888,967 to Li-Tsao Kuo and 5,092,142 to Michael S. Zane et al. The use of a handlebar which comprises a generally U-shaped portion extending forward over a front wheel of a bicycle, with an upwardly inclined forward end portion to facilitate gripping of the handlebar by the rider, also is known from U.S. Pat. No. 4,951,525 to Lucio Borromeo. U.S. Pat. No. 4,878,397 to Dan C. Lennon further discloses a handlebar having a forwardly extending gripping portion and provided with arm rests for the rider, and handlebars with arm rests also are disclosed in U.S. Pat. Nos. 4,873,886 to Rolf Renner and 5,000,469 to Cedric J. Smith.

U.S. Pat. No. 5,163,339 to Edward H. Giard, Jr. et al discloses an auxiliary handlebar with arm rests, wherein the handlebar is longitudinally extendible. PCT application WO 91/16231 published Oct. 31, 1991 by applicant Badgematic, GmbH, discloses an auxiliary handlebar with arm rests which are longitudinally and transversely adjustable.

With prior known bicycle locks, however, when the bicycle is being used for riding and the lock thus is not being used for locking purposes, it then is necessary to store the lock on the bicycle in a suitable manner. This is disadvantageous from the rider's standpoint, particularly in the case of certain locks which are relatively cumbersome and difficult to store, since the storage of the lock on the bicycle interferes with the ability of the rider to ride the bicycle in an enjoyable, comfortable and unimpeded manner.

It has been suggested in U.S. Pat. No. 5,133,568 to Alisa M. Balterman and in U.S Pat. No. 5,138,901 to Ara N. Dabandjian, et al, that a U-shaped bicycle lock can be mounted on the handlebar and used as an auxiliary handlebar to steer the bicycle. These latter patents, however serve to clamp the lock cross member in one or more brackets and have no provision for longitudinal adjustment, i.e., in a front-to-back direction, for rider comfort or for accommodating different styles of bicycle handlebars. Furthermore, the mounting brackets have no provision for arm rests which must be separately provided.

Accordingly, a purpose of this invention is to provide a combination bicycle lock/handlebar assembly by which a lock can be used to lock the bicycle when the bicycle is not in use, and the lock also can be used as an auxiliary handlebar which contributes to the ease and comfort of the rider when the bicycle is being used for riding purposes. To achieve this purpose, the combination bicycle lock/handlebar assembly further includes bracket mechanisms by which the lock can be quick-releasably mounted on existing handlebars of a bicycle, with the bracket mechanisms further including arm rests which cooperate with the lock in its auxiliary handlebar position.

Another object of the inventions to provide adjustable bracket mechanisms for such an auxiliary handlebar, which include arm rests and accommodate a variety of handlebar shapes and rider preferences.

SUMMARY OF THE INVENTION

In general, the subject invention relates to a combination bicycle lock/handlebar assembly which comprises a mechanism for locking a bicycle when the bicycle is not in use, and further comprises a mechanism for releasably mounting the locking mechanism on existing handlebars of the bicycle when the bicycle is in use, with a portion of the locking mechanism extending forward of the bicycle handlebars into an auxiliary handlebar position.

More specifically, the releasable mounting mechanism is of a quick-release type and is supported on the bicycle handlebars by another releasable mechanism. The locking mechanism comprises a U-shaped member having a bight portion and spaced parallel legs which can be releasably locked to an elongated cross-bar member. The U-shaped member extends forward of the bicycle handlebars into the auxiliary handlebar position with its bight portion extending at an angle to the legs thereof to provide an upwardly extending gripping portion. The releasable mounting mechanism comprises spaced-apart, separable bracket mechanisms, each of which includes a set of separable bracket members hinged along one side and between respective ones of which the legs of the U-shaped member are receivable for mounting of the locking mechanism on the bicycle handlebars. Upper ones of the bracket members also include respective arm rest mechanisms for supporting the arms of a rider, and the sides of the bracket members opposite from their hinged sides are provided with quick-release mechanisms for locking and opening the bracket members.

Another type of releasable mounting mechanism comprises spaced apart adjustable bracket mechanisms, each of which include an upper bracket member with a bore adapted to releasably receive a leg of the U-shaped member, and an intermediate bracket member adapted for clamping to the bicycle handlebars, the upper and intermediate bracket members being pivotable with respect to one another, and including an arm rest supported in the upper bracket member.

BRIEF DESCRIPTION OF THE DRAWINGS

FIG. 7 is an enlarged elevational view partly in cross section of a second type of releasable mounting mechanism substitutable for that shown in FIGS. 4–6;

FIG. 8 is a side elevational view of FIG. 7, partly in cross section;

FIG. 9 is a plan view, taken substantially along the line 9—9 in FIG. 7;

FIG. 10 is a similar plan view with the bracket members reoriented; and

DETAILED DESCRIPTION OF THE DISCLOSED EMBODIMENT

Figure 1:
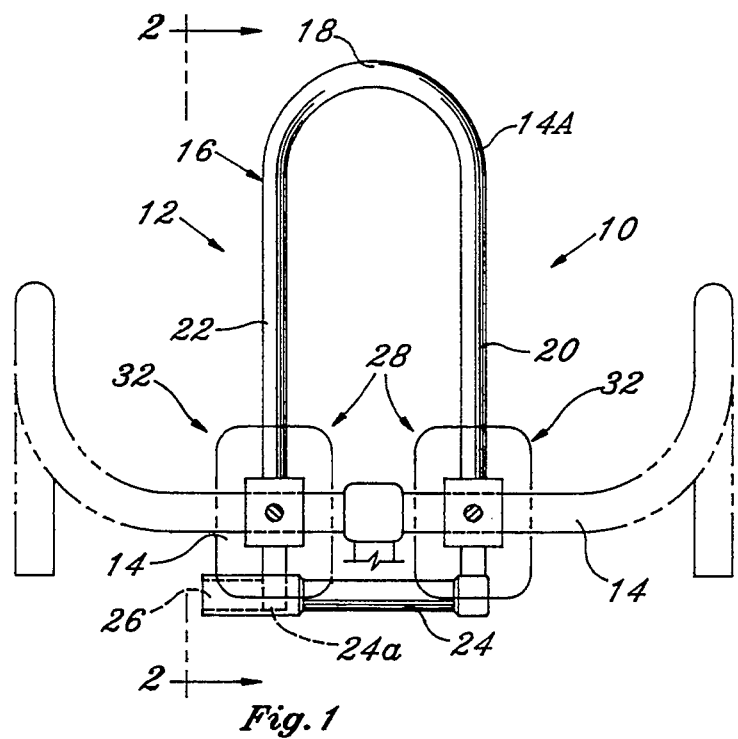
FIG. 1 is a top view of a combination bicycle lock/handlebar assembly in accordance with the invention, in an assembled position on the handlebars of a bicycle, partially in cross-section, with the bicycle handlebars and portions of the assembly shown in phantom.
Figure 2:
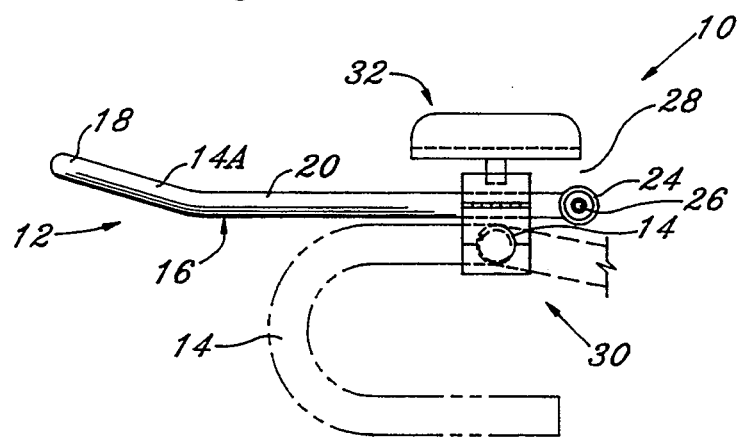
FIG. 2 is a side view of the assembly, as viewed along the line 2—2 in FIG. 1.
Figure 3:
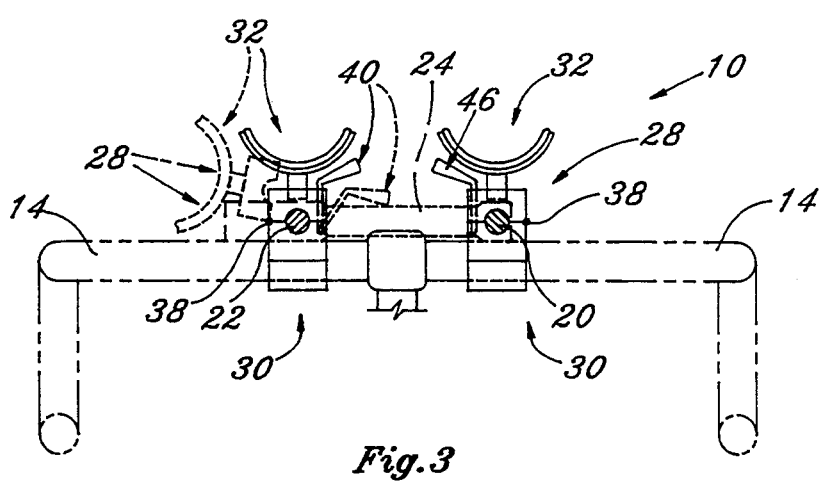
FIG. 3 is a rear cross-sectional view of the assembly, taken substantially along the line 3—3 in FIG. 1.

Referring to FIGS. 1–3, a combination bicycle lock/handlebar assembly 10, comprising a lock mechanism 12 of a generally known type, which can be used to lock a bicycle (not shown) in a known manner, and which can be releasably mounted on existing handlebars 14 (shown in phantom in these figures) of the bicycle, so as to function as an auxiliary handlebar 14A, is shown.

For this purpose, the bicycle lock 12 may be of a type which includes a U-shaped shackle member 16 having a curved bight portion 18 and spaced parallel leg portions 20 and 22, and an elongated cross-bar member 24. An end of the leg 20 is suitably connected or connectable to one end of the cross-bar member 24 in a manner not shown, and an end of the other leg 22 is releasably receivable in an aperture 24a in an opposite end of the cross-bar member, which also includes an internal locking device 26, preferably of a dead bolt-type configuration, for releasably retaining the associated end of the leg 22 in a locked condition in a known manner. The U-shaped member 16 and the cross-bar member 24 preferably are formed of a suitable metal, such as a high grade hardened steel, so as to be more resistant to theft.

The lock 12 is releasably mounted upon the bicycle handlebars 14 by a pair of horizontally spaced-apart, quick-releasable mounting mechanisms 28. The mounting mechanisms 28 are further releasably supported upon the bicycle handlebars 14 by releasable support mechanisms 30 (FIGS. 2–6). Further, when the lock 12 is mounted on the bicycle handlebars 14 by the quick-releasable mounting mechanisms 28, the bight portion 18 of the U-shaped shackle member 16 extends forwardly from the handlebars over the front wheel (not shown) of the bicycle, as illustrated in FIGS. 1 and 2, so that the bight portion can function as the auxiliary handlebar 14A. For this purpose, as is best shown in FIG. 2, the bight portion 18 of the U-shaped member 16 is inclined out of the plane of the legs 20 and 22 of the member, so that the bight portion extends upwardly at an angle to facilitate gripping thereof by a rider. In addition, a pair of suitably padded arm rest assemblies 32, which have an arcuate shape, as best shown in FIG. 3, are supported on top of the quick-releasable mounting mechanisms 28.

Figure 4:
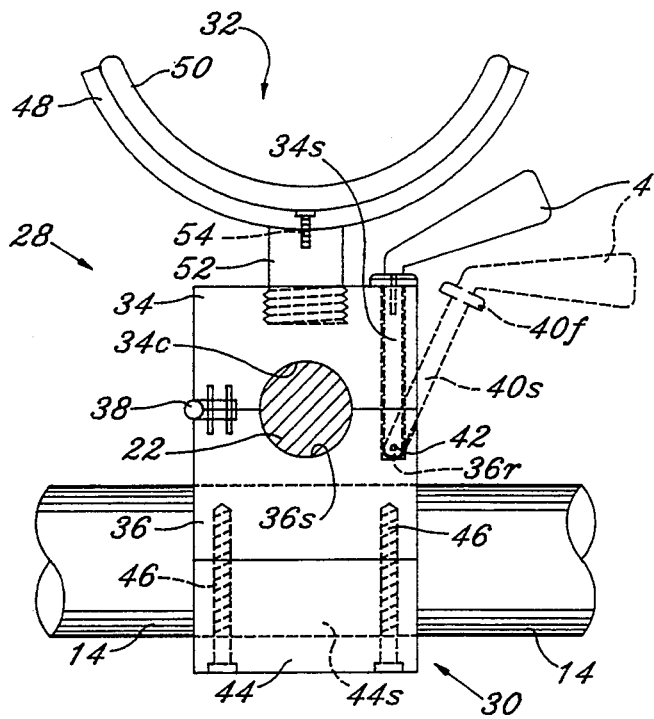
FIG. 4 is an enlarged view of a portion of the assembly as seen in FIG. 3 with portions of the bicycle handlebars shown in solid lines.
Figure 5:
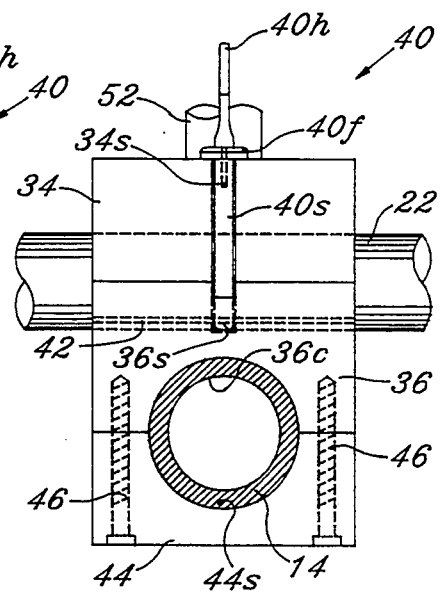
FIG. 5 is a cross-sectional view, taken substantially along the line 5—5 in FIG. 4.
Figure 6:
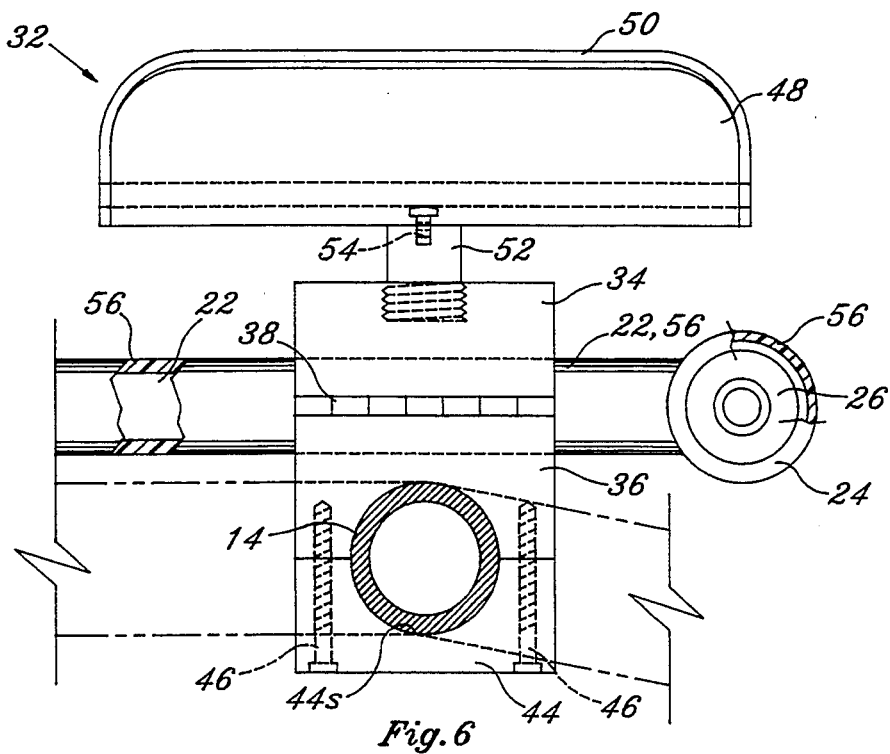
FIG. 6 is a cross-sectional view, taken substantially along the line 6—6 in FIG. 4.

Referring to FIGS. 4–6, each of the quick-releasable mounting mechanisms 28 includes an upper bracket member 34 and an intermediate bracket member 36, with the intermediate bracket member including an upwardly concave saddle portion 36s (FIG. 4), and the upper bracket member including a correspondingly shaped downwardly concave portion 34c, for receiving and clamping a portion of a respective one of the legs 20 and 22 of the lock 12 therebetween. For example, the following description relates to clamping of the leg 22, it being understood that the leg 20 is clamped in the same manner.

The upper and intermediate bracket members 34 and 36 are hinged along one side by a suitable hinge 38 of a known type. At the other side of the bracket members 34 and 36, the intermediate bracket member 36 is provided with a latching or locking assembly 40 including a shaft member 40s having a lower end portion disposed in a tapered recess 36r in an upper portion of the intermediate bracket member and secured in the recess by a suitable pivot pin 42 extending through the intermediate bracket member, as shown in FIG. 5. Above the pivot pin 42, the shaft member 40s is disposed in alignment with a vertical slot 34s in the upper bracket member 34, and at the upper end of the shaft member, the latching assembly 40 also includes a screw-threadably mounted handle 40h and an integral latching flange 40f.

Thus, when the latching assembly 40 is in a released position, as shown by broken lines in FIGS. 3 and 4, the upper bracket member 34 can be pivoted about the hinge 38, as illustrated by broken lines in FIG. 3, for positioning of the leg 22 of the U-shaped shackle member 16 of the lock 12 in the saddle portion 36s of the intermediate bracket member 36. The upper bracket member 34 then can be pivoted to a solid-line position as shown in FIGS. 3 and 4, over the leg 22, whereupon the latching assembly 40 can be pivoted from its released broken-line position, to a position in the slot 34s in which the latching flange 40f moves above a top surface of the upper bracket member, and the handle 40h and the flange then can be rotated to a solid line position to quick-releasably lock the leg in place. Subsequently, when it is desired to use the lock 12 for bicycle locking purposes, it is merely necessary to reverse this procedure and move the latching assembly 40 from its solid-line latching position, to its released broken-line position, whereupon the upper bracket member 34 again can be pivoted about the hinge 38 for removal of the leg 22.

As is best shown in FIGS. 4–6, each of the releasable support mechanisms 30 comprises respective ones of the intermediate bracket members 36 and a lower bracket member 44. More specifically, each intermediate bracket member 36 further includes a downwardly facing, concave portion 36c in opposed relationship to an upwardly concave saddle portion 44s of its respective lower bracket member 44, for receiving a portion of a respective one of the bicycle handlebars 14 therebetween. The intermediate bracket member 36 and the lower bracket member 44 then are releasably secured together about the handlebar portion in clamping relationship by a plurality of bolts or screws 46.

As is further shown in FIGS. 4 and 6, each of the arm rest assemblies 32 includes an upwardly arcuate rigid support member 48, such as of metal or plastic, having an upwardly arcuate foam pad member 50 fixedly mounted thereon, such as by a suitable adhesive. The rigid support member 48 is secured to an upper end of a vertical stub shaft 52 by a screw 54, and the stub shaft is, in turn, screw-threadably mounted in an upper portion of a respective one of the upper bracket members 34. Thus, when the U-shaped shackle member 16 of the lock 12 is supported in the bracket mechanisms 28, the arm rest assemblies 32 cooperate therewith to support the arms of the rider when the rider is using the U-shaped shackle member as the auxiliary handlebar 14A. In addition, the U-shaped shackle member 16 of the lock 12 can be selectively adjusted in the bracket mechanisms 28 in a front-to-back direction according to rider preference and size. The U-shaped shackle member 16 and the cross-bar member 24 of the lock 12 also can be covered with plastic or rubber layers 56, as illustrated in FIG. 6, for protection of bicycle parts when the lock is being used as a lock, or for comfort when being used as the auxiliary handlebar 14A. Further, the arm rest assemblies 32 can be attached directly to the upper bracket members 34 by the screws 54, rather than by means of the vertical stub shafts 52.

Referring to FIGS. 7–10 of the drawing, a second type of releasable mounting mechanism is shown which is angularly adjustable with respect to the handlebars to accommodate different style handlebars which are not straight between the releasable mounting mechanisms. One of a pair of identical horizontally spaced-apart releasable mounting mechanisms 58 is shown in FIGS. 7–10. Each mechanism 58 is further releasably supported upon the bicycle handlebars 60 by releasable support mechanisms 62. Each of the releasable mounting mechanisms 58 includes an upper or first bracket member 64, and an intermediate or second bracket member 66. First bracket member is rotatably mounted for angular adjustment with respect to second bracket member 66 by means of a circular recess 68 with tapered side wall in second bracket member 66 and a corresponding circular tapered boss 70 fitting within the recess 68. Means for releasably securing the first and second bracket members together may comprise a hex head cap screw 72.

The first bracket member includes releasable mounting means arranged to allow longitudinal adjustment of the legs of the U-shaped member in a front-to-back direction in the same manner as the quick-release hinged mechanism previously described. The releasable mounting means comprises a bore 74 extending through the first bracket member 64, which bore is adapted to accommodate one leg 22 of the U-shaped member in the same manner as before, and to secure it in place by means of a thumb screw 76 extending into the bore 74.

An armrest assembly 32 having the same reference numerals as previously described is disposed by a threaded vertical stub shaft 52 in the upper or first bracket member in the same manner as previously described. However a threaded hole 78 receiving the vertical stub shaft 52, is caused to extend into and intersect with bore 74 and is aligned with the screw 72. By this means, as seen in FIG. 9, the screw 72 will be accessible through hole 24 when the armrest assembly 32 is removed.

As seen in FIGS. 7 and 8, each of releasable support mechanisms 62 comprises respective ones of the intermediate (or second) bracket members 66 and a lower bracket member 80. Each intermediate bracket member 66 includes a downwardly facing concave portion 66c in opposed relationship to an upwardly concave saddle portion 80s in the lower bracket member 80, for receiving a portion of a respective one of the bicycle handlebars 60 therebetween. The intermediate bracket member 66 and the lower bracket member 80 then are releasably secured together about the handlebar portion in clamping relationship by a plurality of bolts or screws 82.

Referring to FIGS. 9 and 10, it is seen that when the armrest assemblies 32 are removed, the screw 72 is accessible through hole 78. It may be loosened to permit angular adjustment of leg 22 with respect to handlebar 60. Thereafter the screw 72 may be tightened to serve as securing means for the angularly adjustable first and second bracket members and the armrest assembly replaced.

Figure 11:
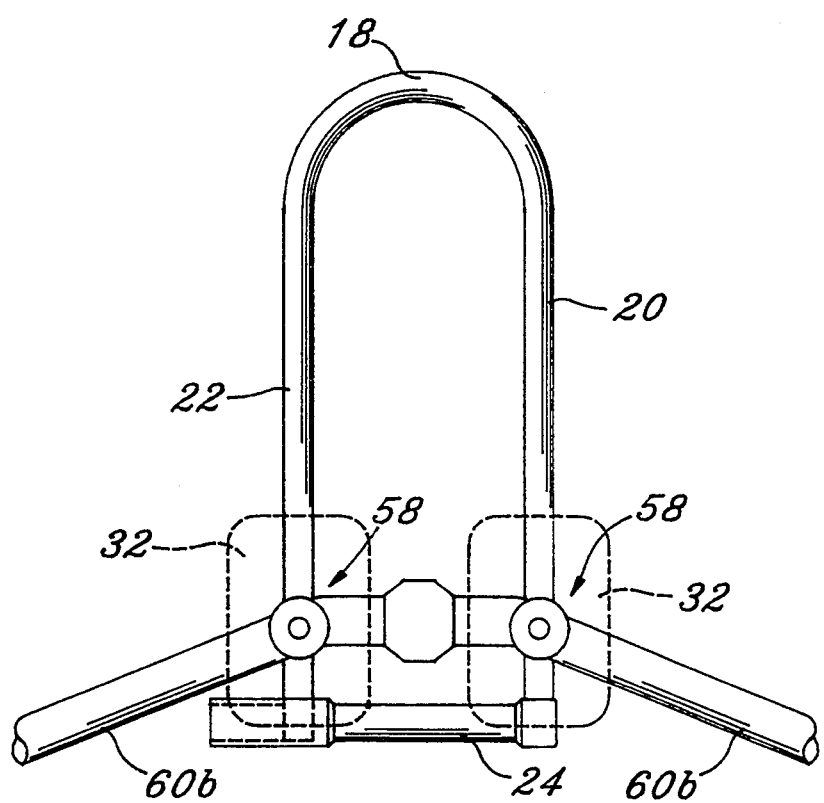
FIG. 11 is a top view of the combination bicycle lock/handlebar assembly corresponding to FIG. 1 but having a different handlebar shape and utilizing the releasable mounting mechanism of FIGS. 7–9.

Referring to FIG. 11 of the drawing, the two spaced-apart mechanisms 58 are mounted on a handlebar 60, which is seen to comprise a central straight section 60a joined by angled side portions 60b. In order to mount a U-shaped lock member of fixed dimension between legs 20, 22, the two spaced-apart bracket means 58 are loosely attached to the angled handlebar sections with arm rests removed and screws 72 loosened. The U-shaped lock member is inserted and screws 82 tightened. Then the U-shaped member is removed and screws 72 tightened. Thus the angular adjustment and separate support mechanisms of the releasable mounting means 58 accommodates different angles and curves on the handlebar of a bicycle, while adjustment of the thumb screws 76 subsequently permits longitudinal adjustment of the U-shaped member.

In summary, a new and improved combination bicycle lock/handlebar assembly, such as the combination bicycle lock/handlebar assembly 10, has been disclosed. The assembly 10 enables a bicycle to be locked in a normal manner when not in use, using the lock 12 comprising the U-shaped shackle member 16 and the locking cross-bar member 24. In addition, for riding purposes, the lock 12 can be quick-releasably mounted on the bicycle handlebars 14 by the quick-releasable mounting mechanisms 28, comprising the hinged upper and intermediate bracket members 34 and 36, and the quick-release latching assemblies 40. Alternatively the quick-releasable mounting mechanisms 58, comprising the pivotable upper and intermediate bracket members 64 and 66 and the locking screws 72 and 76 may be used. The legs of lock 12 are placed in a position in which the bight portion 18 of U-shaped shackle member 16 extends forwardly from the standard bicycle handlebars 14 over the front wheel of the bicycle, to function as the auxiliary handlebar 14A. For this purpose, when the U-shaped shackle member 16 is so mounted, the bight portion 18 thereof extends slightly upwardly, as shown in FIG. 2, to facilitate the gripping thereof by the rider, while at the same time cooperating with the arm rest assemblies 32 upon the upper bracket members and the bight portion 18 may be extended or retracted in a front-to-back direction to contribute to the rider's ease and enjoyment from the standpoint of both comfort and aerodynamic riding position.

It is to be understood that it is not intended to limit the invention to the disclosed embodiment and that various other modifications, additions and alternative designs are, of course, possible in light of the above teachings. Therefore, it also should be understood at this time that within the spirit and scope of the invention as defined by the appended claims, the invention may be practiced otherwise than as specifically described herein above.

What is claimed is:

1. A combination bicycle lock/handlebar assembly for a bicycle, said bicycle having handlebars, which comprises:
   means for locking the bicycle comprising a U-shaped member having a bight portion and spaced parallel legs, and an elongated bar member capable of being releasably locked across the spaced parallel legs of said U-shaped member;
   releasable mounting means for releasably mounting said locking means on the handlebars of the bicycle, wherein said releasable mounting means supports said legs of said U-shaped member on the handlebars of the bicycle with a portion of said U-shaped member disposed forwardly of the bicycle handlebars into an auxiliary handlebar position and wherein said releasable mounting means comprises two spaced-apart releasable mounting mechanisms each including bracket means for receiving respective ones of the legs of the U-shaped member; each of said bracket means being adapted to allow angular adjustment of one of said legs of said U-shaped member with respect to the handlebars; and
   arm rest disposed means on each of said bracket means for supporting arms of a rider.

2. The combination bicycle lock/handlebar assembly as recited in claim 1, wherein said releasable mounting means is adapted to allow longitudinal adjustment of the legs of said U-shaped member in a front to back direction with respect to the handlebars.

3. The combination bicycle lock/handlebar assembly as recited in claim 1, wherein the bight portion of the U-shaped member extends at an angle to the legs thereof to provide an upwardly extending gripping portion when the portion of the U-shaped member is in the auxiliary handlebar position.

4. The combination according to claim 1, wherein said bracket means each comprises a set of separable first and second bracket members, each of said first bracket members defining a bore adapted to receive one of said legs of the U-shaped member within said bore.

5. The combination as recited in claim 4, wherein the first bracket members are rotatably mounted for angular adjustment with respect to said second bracket members and having means for releasably securing said angularly adjustable first and second bracket members together.

6. The combination bicycle lock/handlebar assembly as recited in claim 5, wherein said securing means comprises a screwed connection between said angularly adjustable first and second bracket members.

7. The combination bicycle lock/handlebar assembly as recited in claim 4, wherein said releasable mounting means comprises a thumb screw extending into said bore.

8. An assembly which is adapted for mounting a bicycle lock on the handlebars of a bicycle, said bicycle lock being of a known type comprising a U-shaped member having a bight portion and spaced parallel legs of substantially uniform width, said assembly comprising
   a releasable mounting mechanism for releasably mounting one of said legs of the U-shaped member, said releasable mounting mechanism being adapted to allow angular adjustment of a said leg with respect to the handlebars and also adapted for longitudinal adjustment of a said leg within said releasable mounting mechanism, whereby the bight portion of said U-shaped member may be adjustably positioned extending forwardly of the handlebars to serve as an auxiliary handlebar for the bicycle,
   said releasable mounting mechanism having an arm rest disposed thereon for supporting an arm of a rider when said U-shaped member is being used as an auxiliary handlebar, and
   lower clamping means for releasably supporting said releasable mounting mechanism on the bicycle handlebars.

9. The assembly as recited in claim 8, wherein said releasable mounting mechanism comprises opposed separable first and second bracket members.

10. The assembly as recited in claim 9 wherein said first bracket member defines a bore for receiving one of said legs therein and having a thumbscrew for longitudinally adjusting and releasing said leg.

11. The assembly as recited in claim 9, wherein said first bracket member is rotatably mounted and arranged to be angularly adjustable with respect to said second bracket member, and having means for releasably securing said angularly adjustable first and second bracket members to accommodate different shape bicycle handlebars.

12. The combination according to claim 9 wherein said arm rest is removably attached to said first bracket member.

* * * * *